(12) United States Patent
Brovald et al.

(10) Patent No.: US 6,970,353 B2
(45) Date of Patent: Nov. 29, 2005

(54) FAN HOLDER AND COMPONENTS COOLING DUCT ASSEMBLY

(75) Inventors: Russell K. Brovald, Mountain View, CA (US); Brett C. Ong, San Jose, CA (US); Donggyu Kim, Seoul (KR)

(73) Assignee: Sun Microsystems, Inc., Santa Clara, CA (US)

( * ) Notice: Subject to any disclaimer, the term of this patent is extended or adjusted under 35 U.S.C. 154(b) by 163 days.

(21) Appl. No.: 10/448,247

(22) Filed: May 29, 2003

(65) Prior Publication Data

US 2004/0240175 A1    Dec. 2, 2004

(51) Int. Cl.⁷ ................................................. G06F 1/20
(52) U.S. Cl. .................... 361/687; 361/688; 165/80.2; 165/121
(58) Field of Search .............................. 361/687–695; 165/80.2, 80.3, 121, 122

(56) References Cited

U.S. PATENT DOCUMENTS

| | | | |
|---|---|---|---|
| 5,707,282 A | * | 1/1998 | Clements et al. ........... 454/184 |
| 6,040,981 A | * | 3/2000 | Schmitt et al. ............. 361/695 |
| 6,269,001 B1 | | 7/2001 | Matteson et al. |
| 6,288,898 B1 | | 9/2001 | Johnson et al. |
| 6,351,380 B1 | | 2/2002 | Curlee et al. |
| 6,556,437 B1 | | 4/2003 | Hardin |
| 6,665,908 B1 | | 12/2003 | Mease |
| 6,678,157 B1 | * | 1/2004 | Bestwick ..................... 361/695 |
| 6,714,411 B2 | | 3/2004 | Thompson et al. |
| 6,731,502 B1 | | 5/2004 | Hsu |
| 2004/0196629 A1 | * | 10/2004 | Broder et al. |

* cited by examiner

Primary Examiner—Yean-Hsi Chang
(74) Attorney, Agent, or Firm—Meyertons Hood Kivlin Kowert & Goetzel, P.C.; Jeffrey C. Hood; Gareth M. Sampson

(57) ABSTRACT

A computer component cooling apparatus is described. The cooling apparatus may include a fan assembly. The fan assembly may be coupled to a computer chassis. A duct may be slidably coupled to the fan assembly. The duct may be positioned in at least two positions on the fan assembly without being uncoupled from the fan assembly. In a first position, the duct may direct a flow of air over one or more computer components. In a second position, the duct may allow access to the one or more of the computer components.

32 Claims, 5 Drawing Sheets

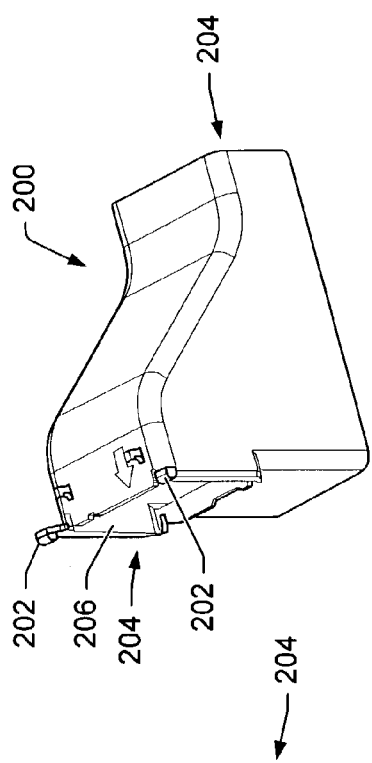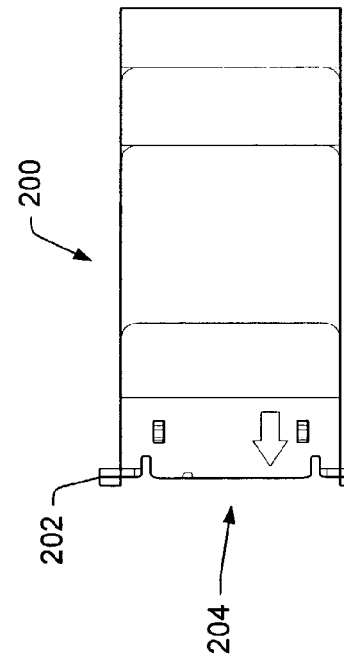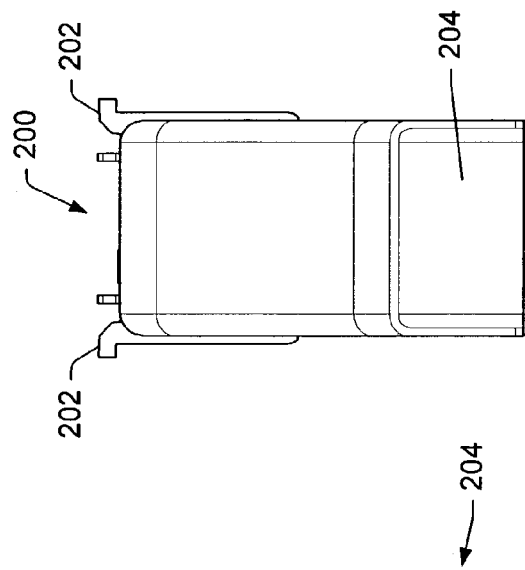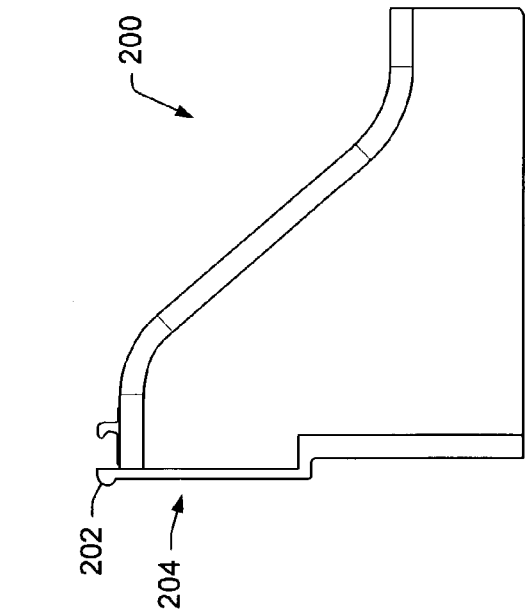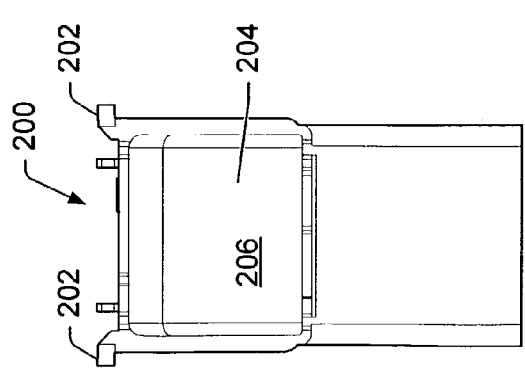

FAN HOLDER AND COMPONENTS COOLING DUCT ASSEMBLY

BACKGROUND

1. Field of the Invention

This invention generally relates to the field of cooling computer components. Certain embodiments relate to an apparatus for directing a flow of air over one or more computer components located in a computer chassis.

2. Description of the Related Art

Numerous components located inside a computer chassis require proper cooling to operate effectively. Without proper cooling, heat generating computer components may overheat. Overheating of computer components may reduce operating effectiveness of the components and lead to component failure. System fans (e.g., fans coupled to the computer system chassis) typically do not provide enough air flow directed to or from specific computer components to provide proper cooling for those specific components. Generally, some type of duct coupled to a fan or other air direction means has to be provided to properly cool specific components.

Air ducts used to direct air flow toward components may be cumbersome to install and may tend to decrease the serviceability of (i.e., inhibit access to) the components. An air duct may be coupled to a fan assembly using screws or snaps. To gain access to the components a duct provides cooling for, the duct may have to be completely removed by unsnapping the duct or removing the screws. Removing the duct in such a manner can be time consuming and cumbersome. In addition, repeated use of screws or snaps may lead to loss of parts (e.g., screws) or breakage and/or failure of the screws, screw threads, or snaps. Some of these components may lack access (e.g., surface area) for certain types of air direction means to be coupled to the components.

SUMMARY

In an embodiment, a cooling apparatus may include a fan assembly and a duct. The fan assembly may be coupled to a computer chassis. In some embodiments, the fan assembly may be removably coupled to the computer chassis. The duct may be slidably coupled to the fan assembly. The duct may be positionable in two or more positions on the fan assembly. In a first position, the duct may direct a flow of air over one or more computer components inside the computer chassis. The duct may, in some embodiments, be locked in the first position (e.g., using a snap and/or stops at one end of the grooves to hold the duct in position). In a second position, the duct may allow access to the computer components cooled with the duct in the first position.

The fan assembly may include one or more grooves. The duct may be slidably coupled to the grooves on the fan assembly. Extensions on the duct may slidably couple to the grooves. The duct may slide along a length of the grooves between the first position and the second position. In certain embodiments, the duct may be slid along the length of the grooves without using tools.

The duct may include a channel to direct a flow of air over the components. The channel may direct a flow of air for efficient and proper cooling of the components. The channel may be shaped to direct a flow of air over components of various sizes and shapes.

BRIEF DESCRIPTION OF THE DRAWINGS

Advantages of the present invention may become apparent to those skilled in the art with the benefit of the following detailed description and upon reference to the accompanying drawings in which:

FIGS. 6A–6D depict several views of an embodiment of a duct.

FIG. 7 depicts a perspective view of an embodiment of a duct.

Figure 1:
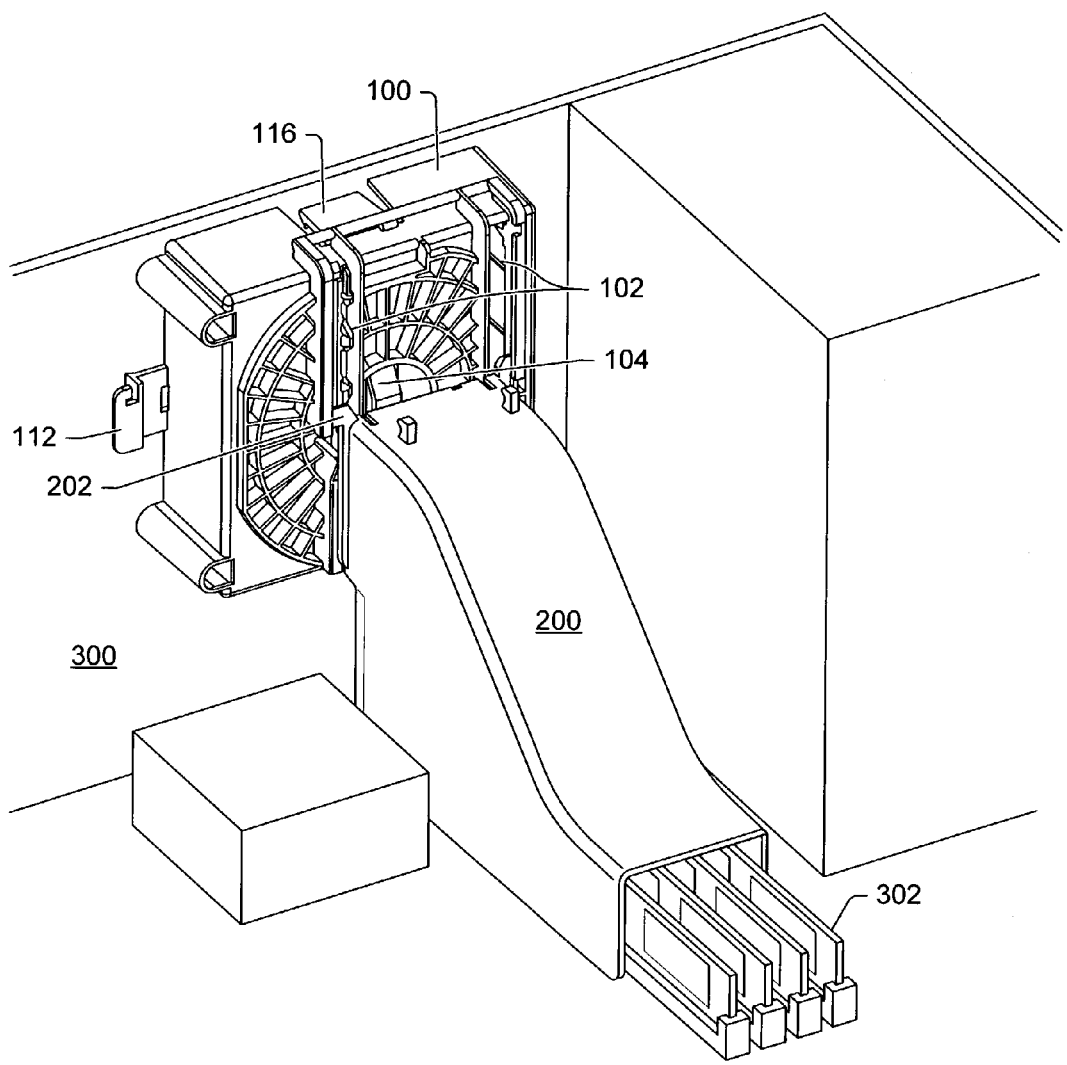
FIG. 1 depicts a perspective view of an embodiment of a cooling apparatus coupled to a computer chassis in a cooling position.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 depicts a perspective view of an embodiment of a cooling apparatus coupled to a computer chassis in a cooling position. The cooling apparatus may include fan assembly 100 and duct 200. Fan assembly 100 may be coupled to computer chassis 300. Fan assembly 100 may be coupled computer chassis 300 by any means typical in the art. In some embodiments, fan assembly 100 is coupled to chassis 300 with screws, bolts, clips, or any other suitable mechanism. In an embodiment, fan assembly 100 may include snaps or hooks that fit under a lip on chassis 300.

Duct 200 may be coupled to fan assembly 100. In certain embodiments, duct 200 may be slidably coupled to fan assembly 100. Fan assembly 100 may have one or more grooves 102. Duct 200 may be coupled to grooves 102. Duct 200 may have extensions 202. Extensions 202 may slide in grooves 102 so that duct 200 moves along a length of the grooves. In embodiments described herein, two grooves 102 and two extensions 202 are used. Any number of grooves 102 and extensions 202, however, may be used depending on, for example, the number of components to be cooled, a size of fan assembly 100 or duct 200, or a desired use of the cooling apparatus. In certain embodiments, grooves 102 allow duct 200 to move up and down along fan assembly 100. In some embodiments, grooves 102 may allow duct 200 to move in other directions relative to fan assembly 100

(e.g., horizontally along the fan assembly or at a 45° angle from horizontal along the fan assembly).

Figure 2:
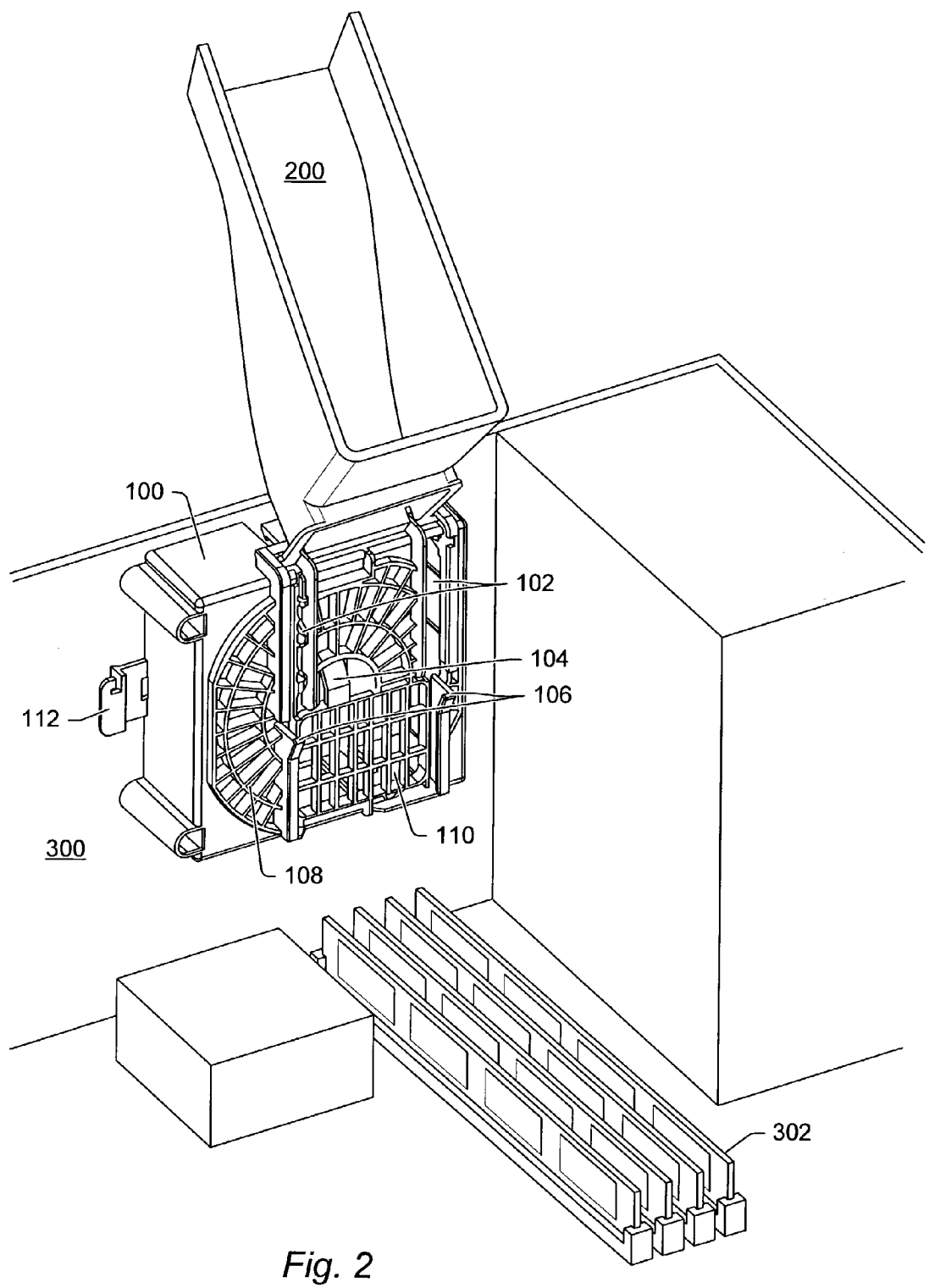
FIG. 2 depicts a perspective view of an embodiment of a cooling apparatus coupled to a computer chassis in an open position.

FIG. 2 depicts a perspective view of an embodiment of the cooling apparatus coupled to a computer chassis in an open position. Duct 200 may slidably move along grooves 102 from the "cooling" position shown in FIG. 1 to the "open" position shown in FIG. 2. Duct 200 may move between the cooling position and the open position without uncoupling the duct from fan assembly 100. In certain embodiments, duct 200 may be moved between the cooling position and the open position without using tools (e.g., the duct may be moved by a hand). Tools used may include, for example, screwdrivers, wrenches, and/or hammers. Moving duct 200 between the cooling position and the open position without tools allows for easy and quick access to components 302 cooled by the duct.

In certain embodiments, duct 200 may be held securely, or locked, in either a cooling position or an open position. Snap 104 may lock duct 200 in a cooling position. Duct 200 may be locked or held in an open position by a shape of grooves 102. In some embodiments, duct 200 may balance in the open position such that the duct is held in the open position.

As shown in FIG. 1, in a cooling position, duct 200 may direct a flow of air over one or more computer components 302. A flow of air over components 302 may provide cooling for the components. Directing a flow of air with duct 200 may provide efficient cooling of components 302.

Duct 200 may be moved to an open position, as shown in FIG. 2, to allow access to components 302. Components 302 may be repaired or replaced when duct 200 is in the open position. Components 302 may also be removed or added when duct 200 is in the open position. Duct 200 does not have to be uncoupled from fan assembly 100 to allow access to components 302. Component servicing may require less time when components 302 may be accessed without uncoupling duct 200 from fan assembly 100.

Figure 3C:
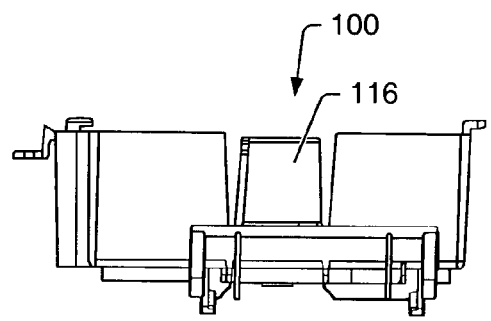
FIG. 3C depicts a top view of an embodiment of a fan assembly.
Figure 3B:
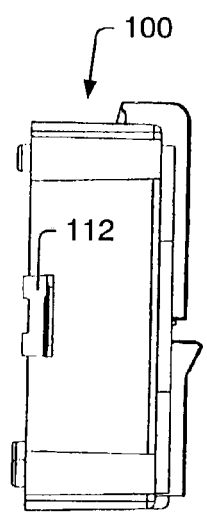
FIG. 3B depicts a side view of an embodiment of a fan assembly.
Figure 3A:
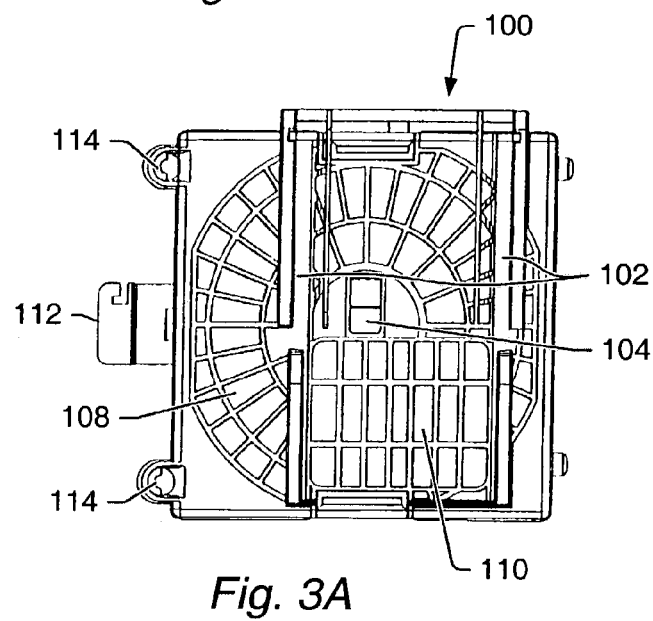
FIG. 3A depicts a front view of an embodiment of a fan assembly.
Figure 4B:
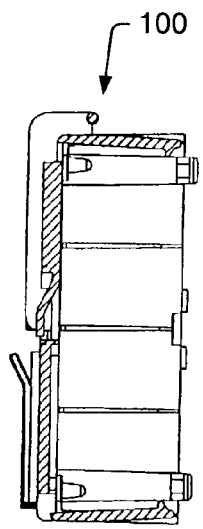
FIG. 4B depicts a cross-sectional side view of an embodiment of a fan assembly.
Figure 4A:
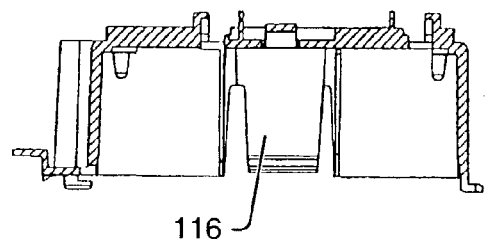
FIG. 4A depicts a cross-sectional top view of an embodiment of a fan assembly.
Figure 5:
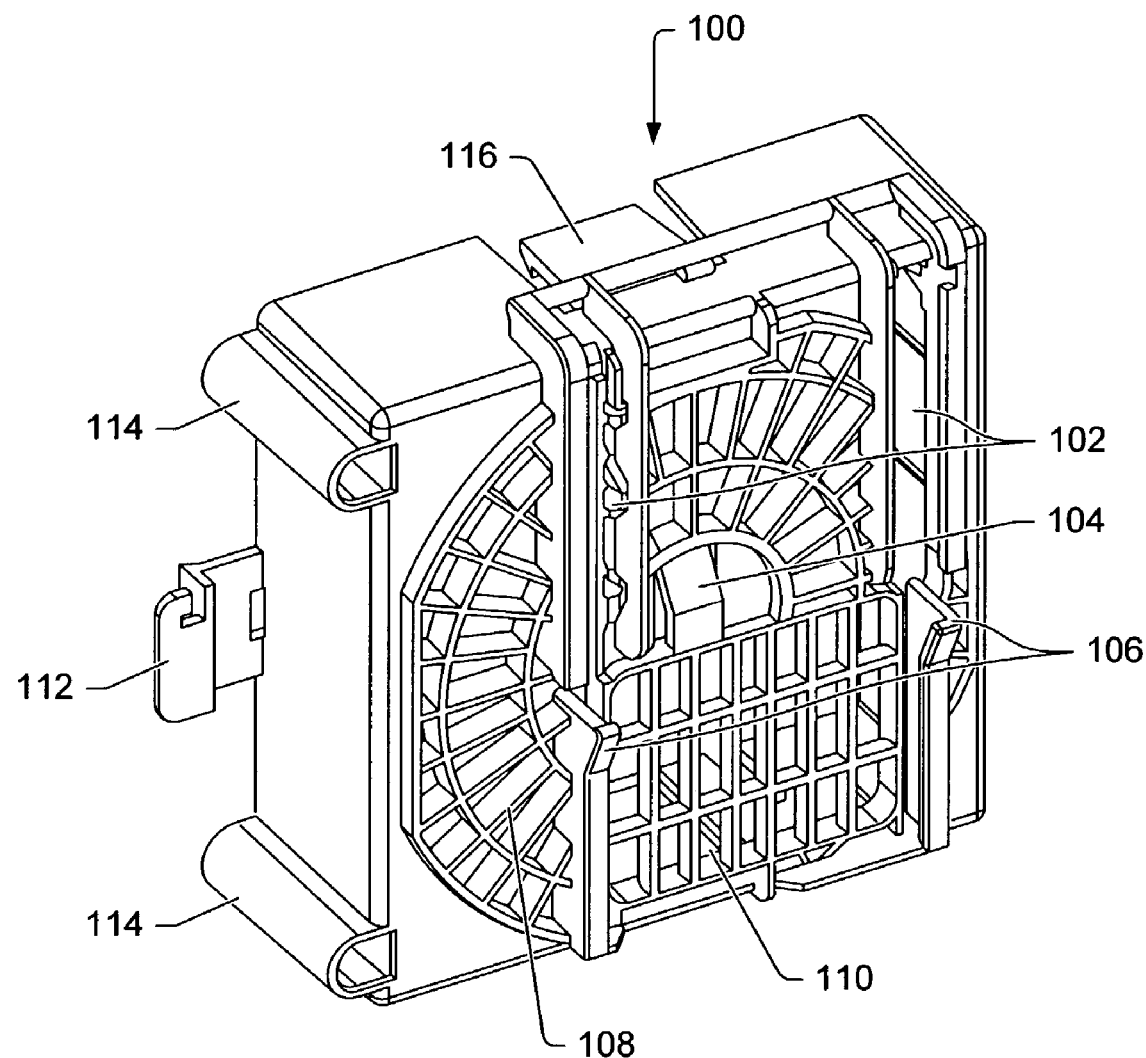
FIG. 5 depicts a perspective view of an embodiment of a fan assembly.

FIGS. 3A–3C, FIGS. 4A–4B, and FIG. 5 depict several views of an embodiment of fan assembly 100. FIG. 3A depicts a front view of an embodiment of fan assembly 100. FIG. 3B depicts a side view of an embodiment of fan assembly 100. FIG. 3C depicts a top view of an embodiment of fan assembly 100. FIG. 4A depicts a cross-sectional top view of an embodiment of fan assembly 100. FIG. 4B depicts a cross-sectional side view of an embodiment of fan assembly 100. FIG. 5 depicts a perspective view of an embodiment of fan assembly 100.

Fan assembly 100 may be made of materials that have excellent mechanical strength and good thermal stability. For example, fan assembly 100 may be made of polymers such as, but not limited to, resin polymers, polyethylene, polyvinyl chloride, etc. In one embodiment, fan assembly 100 is made of Starex HF (high flow) ABS available from Cheil Industries (Korea). In an embodiment, fan assembly 100 is a unitary device made as a single piece. A fan may be coupled inside of fan assembly 100. The fan may be any typical fan used for cooling computer components or a computer chassis.

As shown in FIG. 5, fan assembly 100 may include grooves 102. Grooves 102 may extend along a portion of the height of fan assembly 100. In certain embodiments, stops 106 may be located at a lower end of grooves 102. Stops 106 may define the cooling position for duct 200 at end of grooves 102. In some embodiments, duct 200 may rest on stops 106 (e.g., for structural support in the cooling position). In the cooling position, duct 200 may be held in position between snap 104 and stops 106, as shown in FIGS. 1 and 2. In some embodiments, the location of stops 106 may be adjustable to allow the cooling position of duct 200 to be adjusted (e.g., for various component sizes).

As shown in FIGS. 3A and 5, fan assembly 100 may include vents 108. Vents 108 may be in any typical pattern used for allowing a flow of air through fan assembly 100. In certain embodiments, vents 108 may have unique pattern 110 for a flow of air through duct 200, when the duct is in the cooling position. Typically, unique pattern 110 includes rectangular vents, as shown in FIGS. 3A and 5.

Fan assembly 100 may include cable guide 112. Cable guide 112 may be used to provide a guide for power cables (e.g., a three-wire power cable) for fan assembly 100. The power cables may be coupled to a power source to provide power for the fan in fan assembly 100. Cable guide 112 may provide a guide for power cables so that the power cables do not interfere with other components or assemblies in the computer chassis.

In certain embodiments, fan assembly 100 may include mounting holes 114. Mounting holes 114 may be used to allow screws, bolts, or other fastening devices to couple fan assembly 100 to the computer chassis. Mounting holes 114 may be threaded openings or pass-through openings (e.g., sleeves). In some embodiments, snaps 116, shown in FIGS. 3C, 4A, and 5, may be used to couple fan assembly 100 to the computer chassis. In some embodiments, screws, bolts, or other fastening devices may be used in combination with snaps 116 to couple fan assembly 100 to the computer chassis.

FIGS. 6A–6D depict several views of an embodiment of duct 200. FIG. 7 depicts a perspective view of an embodiment of duct 200. Duct 200 may be made of materials that have excellent mechanical strength and good thermal stability. For example, duct 200 may be made of polymers such as, but not limited to, resin polymers, polyethylene, and polyvinyl chloride. In one embodiment, duct 200 is made of Starex HF (high flow) ABS available from Cheil Industries (Korea). In an embodiment, duct 200 is a unitary device made as a single piece.

Duct 200 may include extensions 202. Extensions 202 may be shaped to fit into grooves 102 of fan assembly 100 (e.g., as shown in FIG. 1). Extensions 202 may be shaped to allow the extensions to slide along grooves 102. Extensions 202 may allow duct 200 to slidably couple to fan assembly 100. In certain embodiments, extensions 202 may be coupled to (e.g., pressed into) grooves 102 by hand (i.e., without using tools).

Duct 200 may include channel 204. Channel 204 may direct a flow of air over components in a computer chassis. Duct 200 may have an open bottom, as shown in FIG. 2. The open bottom of duct 200 may allow the duct to cover components 302 in chassis 300 and direct the flow of air over the components, as shown in FIG. 1. Duct 200 may have an open bottom that is shaped to cover a variety of different components. An open bottom shape of channel 204 may allow a flow of air to be directed over components with small surface areas without coupling an air duct to the components.

Channel 204 may have openings on each end of duct 200 to allow air to flow through the channel and the duct. As shown in FIG. 7, channel 204 may have first opening 206 on an end of duct 200 that is coupled to fan assembly 100. First opening 206 may align with unique pattern 110 on vents 108 of fan assembly 100 when duct 200 is in the cooling position. Channel 204 may direct an efficient flow of air over components in a computer chassis so that the components are properly cooled by the fan assembly 100 and the duct.

In embodiments described herein, fan assembly 100 and duct 200 are not limited to any particular design of a computer chassis or computer components. The dimensions of fan assembly 100 and duct 200 may be designed to properly accommodate any selected computer chassis and/or provide cooling for any number or size of computer components. Fan assembly 100 and duct 200 may also be designed to accommodate any variations in configuration (e.g., sizes, angles, or relative positions) of computer chassis and/or computer components.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer component cooling apparatus, comprising:
   a fan assembly configured to be coupled to a computer chassis; and
   a duct slidably coupled to the fan assembly, wherein the duct is configured to be positioned in at least two positions on the fan assembly without being uncoupled from the fan assembly, wherein the duct is configured to slide in one or more grooves on the fan assembly from a first position to a second position, wherein in the first position the duct is configured to direct a flow of air over one or more computer components in the computer chassis, and wherein in the second position the duct is configured to allow access to the one or more computer components.

2. The apparatus of claim 1, wherein the duct is configured to lock in the first position.

3. The apparatus of claim 1, wherein the fan assembly comprises a snap configured to lock the duct in the first position.

4. The apparatus of claim 1, wherein the duct is configured to lock in the second position.

5. The apparatus of claim 1, wherein the fan assembly comprises one or more grooves, and wherein the duct is configured to slidably couple to at least one of the grooves.

6. The apparatus of claim 1, wherein the duct comprises one or more extensions configured to slide in one or more grooves on the fan assembly.

7. The apparatus of claim 1, wherein the duct is configured to slide in one or more grooves on the fan assembly without using tools.

8. The apparatus of claim 1, wherein the fan assembly is removably coupled to the computer chassis.

9. The apparatus of claim 1, wherein the duct is configured to be coupled to the fan assembly without using tools.

10. The apparatus of claim 1, wherein the fan assembly comprises a cable guide.

11. The apparatus of claim 1, wherein the apparatus comprises polymeric material.

12. A system for cooling computer components, comprising:
    a computer chassis;
    a fan assembly configured to be coupled to the computer chassis; and
    a duct slidably coupled to the fan assembly, wherein the duct is configured to be positioned in at least two positions on the fan assembly without being uncoupled from the fan assembly, wherein the duct is configured to slide in one or more grooves on the fan assembly from a first position to a second position, wherein in the first position the duct is configured to direct a flow of air over one or more computer components in the computer chassis, and wherein in the second position the duct is configured to allow access to the one or more computer components.

13. The system of claim 12, wherein the duct is configured to lock in the first position.

14. The system of claim 12, wherein the duct is configured to lock in the second position.

15. The system of claim 12, wherein the fan assembly comprises one or more grooves, and wherein the duct is configured to slidably couple to at least one of the grooves.

16. The system of claim 12, wherein the duct comprises one or more extensions configured to slide in one or more grooves on the fan assembly.

17. The system of claim 12, wherein the duct is configured to slide in one or more grooves on the fan assembly without using tools.

18. The system of claim 12, wherein the fan assembly is removably coupled to the computer chassis.

19. The system of claim 12, wherein the duct is configured to be coupled to the fan assembly without using tools.

20. A computer component cooling apparatus, comprising:
    a fan assembly configured to be coupled to a computer chassis, wherein the fan assembly comprises one or more grooves; and
    a duct slidably coupled to the one or more grooves on the fan assembly, wherein the duct is configured to be positioned in at least two positions along the grooves without being uncoupled from the grooves, and wherein the duct is configured to slide in the one or more grooves on the fan assembly from a first position to a second position.

21. The apparatus of claim 20, wherein in a first position the duct is configured to direct a flow of air over one or more computer components in the computer chassis.

22. The apparatus of claim 20, wherein in a second position the duct is configured to allow access to the one or more computer components in the computer chassis.

23. The apparatus of claim 20, wherein the duct is configured to lock in at least one position.

24. The apparatus of claim 20, wherein the fan assembly comprises a snap configured to lock the duct in at least one position.

25. The apparatus of claim 20, wherein the duct comprises one or more extensions configured to slide in the one or more grooves on the fan assembly.

26. The apparatus of claim 20, wherein the duct is configured to slide in the one or more grooves on the fan assembly without using tools.

27. The apparatus of claim 20, wherein the fan assembly is removably coupled to the computer chassis.

28. The apparatus of claim 20, wherein the fan assembly is coupled to the computer chassis using a snap mechanism.

29. The apparatus of claim 20, wherein the duct is configured to be coupled to the fan assembly without using tools.

30. The apparatus of claim 20, wherein the fan assembly comprises a cable guide.

31. A computer component cooling apparatus, comprising:
- a fan assembly configured to be coupled to a computer chassis; and
- a duct slidably coupled to the fan assembly, wherein the duct is configured to be positioned in at least two positions on the fan assembly without being uncoupled from the fan assembly, wherein in a first position the duct is configured to direct a flow of air over one or more computer components in the computer chassis, wherein in a second position the duct is configured to allow access to the one or more computer components, and wherein the duct is configured to lock in the second position.

32. A computer component cooling apparatus, comprising:
- a fan assembly configured to be coupled to a computer chassis, wherein the fan assembly comprises one or more grooves; and
- a duct slidably coupled to the one or more grooves on the fan assembly, wherein the duct is configured to be positioned in at least two positions along the grooves without being uncoupled from the grooves, and wherein in a second position the duct is configured to allow access to the one or more computer components in the computer chassis.

* * * * *